March 13, 1956  E. A. JACOBSEN  2,737,772
CUTTING DISK ASSEMBLY FOR POWER MOWERS
Filed Nov. 30, 1954  2 Sheets-Sheet 1

INVENTOR:
EINAR A. JACOBSEN
BY: *Arthur J. Hansmann*
ATTORNEY

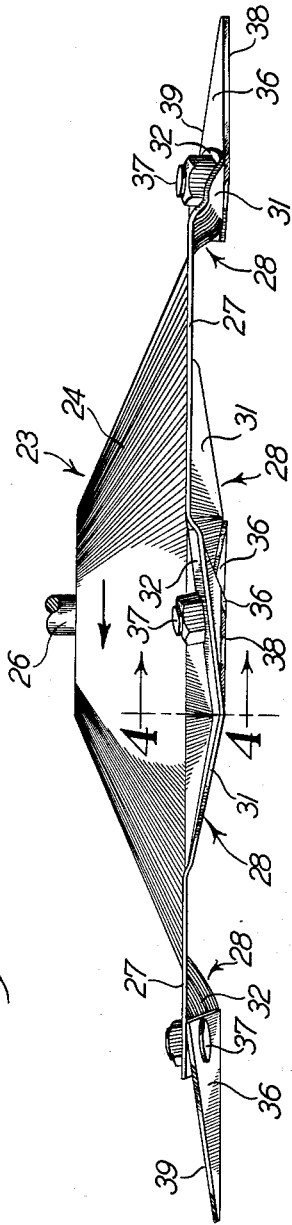
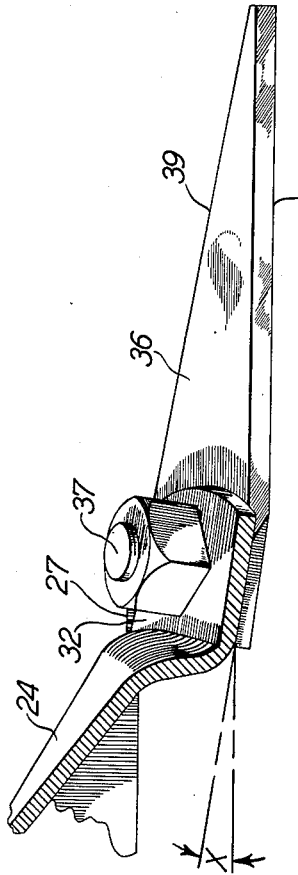

United States Patent Office 2,737,772
Patented Mar. 13, 1956

2,737,772

CUTTING DISK ASSEMBLY FOR POWER MOWERS

Einar A. Jacobsen, Racine, Wis., assignor to Jacobsen Manufacturing Company, Racine, Wis., a corporation of Wisconsin Application November 30, 1954, Serial No. 472,117

4 Claims. (Cl. 56—295)

This invention relates to rotary type of lawn mowers, and, specifically, it relates to the rotor for lawn mowers.

It is an object of this invention to provide a rotary type lawn mower with a rotor which has improved cutting qualities. Particularly, an object is to provide a rotor which will lift blades of grass to be cut by creating an air flow with the rotor.

Another object is to provide a lawn mower cutting rotor which will chop the cut grass into fine particles and thereby eliminate the necessity of raking after cutting.

Another object is to provide a lawn mower rotor with a fan type of cutting blades which can be easily reversed on their mounting to present a different cutting edge.

Still another object is to provide more than two cutting blades on a lawn mower rotor and to do so in an inexpensive but effective manner to increase the frequency of cutting for each revolution of the rotor.

A further object is to provide a law mower cutting rotor with a safety feature on the cutting blades to protect the operator and the blades from damage and to also permit easy and inexpensive handling and replacement of damaged and worn blades.

The foregoing and other objects and advantages will become more readily apparent upon reading the following description in conjunction with the accompanying drawings, wherein, Fig. 1 is a perspective view of one type of a lawn mower incorporating a preferred embodiment of this invention.

Fig. 3 is an enlarged side elevational view of a fragment of the rotor of the mower shown in Fig. 2 but shown in the upright operating position.

Fig. 4 is a sectional view taken on the line 4—4 of Fig. 3.

Similar reference numerals refer to similar parts throughout the several views.

Figure 1:
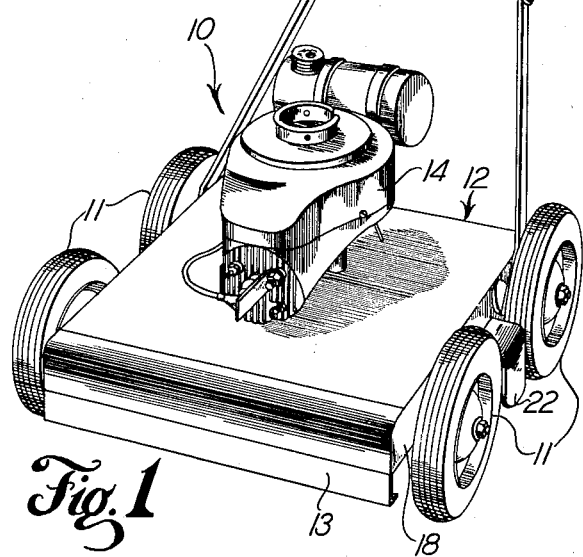

Fig. 1 shows a lawn mower 10 of the powered type having four ground engaging wheels 11 which suitably rotatably attach to a housing 12 to horizontally support the same. The latter is provided with a vertically disposed front end having a detachable lower panel or guard 13 which can be removed for heavy mowing work. A usual gasoline engine 14 is mounted on the top of the housing 12 to empower the cutting rotor described later. Also, a conventional handle 16 is attached at its lower ends to opposite sides of the housing 12 in any suitable manner.

Figure 2:
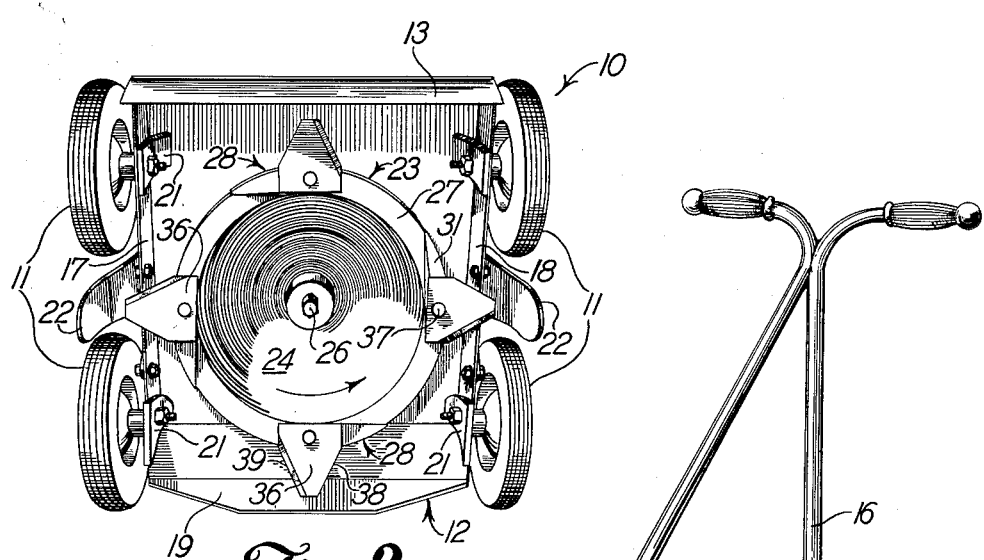
Fig. 2 is a bottom perspective view of the mower shown in Fig. 1.

The housing 12 is shown from the bottom in Fig. 2 wherein the housing is shown to include depending sides 17 and 18 with a depending back panel 19. Thus, the housing 12 is formed of a generally horizontal top and depending edge or side sections to be box-shaped with an open bottom. The opposite sides 17 and 18 support the wheels 11 on mounting brackets 21, as shown, and the sides also each include a guard 22 which depends therefrom between each pair of side wheels 11 to block debris which might be thrown by the rotor described later.

While this particular lawn mower is shown and described, it should be understood that the invention hereinafter described is not limited in application to the particular mower 10. It will hereinafter be apparent that the invention can be incorporated in other styles of rotary lawn mowers as well.

Fig. 2 also shows a mower rotor 23 which includes a disc or plate 24 and a shaft 26. The disc is non-rotatably and concentrically attached to the shaft which projects through the top of the housing 12, and the shaft is, of course, rotated in any well-known manner by the engine 14. The disc 24 is thus rotated in the direction of the arrow shown in Fig. 2 and is centered in the housing 12. As will be hereinafter apparent, the disc is the mounting member for the blades described later.

As shown in Fig. 3, the disc 24 is frusto-conical with a lower outwardly flared circular edge or rim 27. The latter is transversely disposed with respect to the shaft 26, except for sections 28, and it is therefore horizontal in an operating position, and located approximately level with lower edges of the housing sides. Upset sections 28 are formed at spaced intervals on the rim 27, and, in the embodiment shown, four such sections are provided. These sections are continuous and integral portions of the rim 27 and comprise a leading downwardly inclined portion 31 and a trailing upwardly inclined portion 32, with respect to the direction of disc rotation shown by the arrow on Fig. 3. Figs. 3 and 4 both show that the portion 32 is also positioned to be inclined downwardly toward the radially outer edge of the portion as shown by the angle indicated "X." The angle "X" is formed by a lower horizontal line and an upper line which is aligned with the lower surface of the portion 32. All four of the offset sections 28 are similarly shaped and positioned.

A blade 36 is attached underneath each of the portions 32 by a bolt 37 passing through the two members, as shown, to permit the blade to project beyond the circumference of the disc. The blade is thus pivotal about the bolt 37 when the blade is subjected to a sufficient force such as that encountered in striking an object which the blade cannot cut. Fig. 2 shows the blade to be substantially triangularly shaped in the portion extending beyond the rim of the disc. Thus, a cutting edge 38 is positioned with a negative angle since the end of the edge adjacent the rim is in a leading position with respect to the radially outer end of the edge. The other side of the triangle of the blade is also provided with a cutting edge 39 so that the blade 36 can be inverted or reversed on its mounting bolt 37 to present the edge 39 in the same position as that of the edge 38. The symmetrical blade design permits blade reversal and a new cutting edge is provided.

Since the disc portion 32 is inclined as described, the blade 36 is also inclined to have a pitch, as shown. Also, since the portion 32 is inclined downwardly toward its outer edge, the blade cutting edge 38 is horizontally disposed although it is triangular in shape. Thus, the portion 32 has a compound angle to produce a blade pitch and to position the cutting edge horizontally. The four blades 36 then act as fan blades as they are rotated with the disc 24 to cut grass or the like. In the rotation, air is drawn up under the sides of the housing 12 and, in so doing, blades of grass are likewise urged or sucked upwardly to where the blades 36 cut the grass at a uniform length. Also, when the grass is cut, the suction created by the rotor retains the cut grass in the housing 12 for chopping into fine particles. The chopped grass is then deposited onto the ground.

If a rectangularly shaped blade were employed instead of the triangular blade shown, then the angle "X" would not, of course, be necessary as the cutting edge on a rectangular blade would be horizontally disposed without the angle "X."

While a specific embodiment of this invention has been shown and described, it should be obvious that certain changes can be made therein and the invention should, therefore, be limited only by the scope of the appended claims.

I claim:

1. In a rotary type lawn mower, a rotor comprising a vertically disposed rotatable shaft, a plate non-rotatably and concentrically attached to the lower end of said shaft, said plate including at least three sections spaced around the periphery of said plate and each of said sections having a rotationally forward end and a rotationally rearward end with respect to the direction of rotor rotation and said sections being angularly disposed to the horizontal plane to tilt down from said rotationally rearward end to said rotationally forward end of said sections, a cutting blade removably attached to each of said sections between said forward end and said rearward end to project beyond said plate and having a cutting edge at the rotationally forward edge thereof and at the rotationally rearward edge thereof with respect to the direction of rotor rotation for reversibility of said blade for selective forward positioning of either said cutting edge and for permitting tilting of said blade to effect a suction lift of the lawn being mowed upon rotation of said shaft.

2. In a rotor for a rotary type lawn mower, the combination comprising a rotatable shaft, a disc concentrically and non-rotatably attached to the lower end of said shaft, said disc having four circumferentially spaced and horizontally angular sections with a rotationally leading portion of each of said sections lower than a trailing portion thereof with respect to the direction of rotation of said shaft, a flat blade removably attached to each of said sections between said leading portion and said trailing portion to be correspondingly angularly disposed and project beyond the rim of said disc and having a cutting edge on the rotationally leading end of each said blade with respect to the direction of rotation of said shaft.

3. In a rotary type lawn mower, a rotor comprising a shaft rotatably mounted in said mower to be vertically disposed in the mower operating position, a disc concentrically and non-rotatably mounted on said shaft and terminating in a radially outer edge, at least three circumferentially disposed and spaced sections formed in said disc to be offset thereon and form indentations in said disc with an intermediate portion of each of said sections being a maximum indentation with respect to the remainder of each of said sections and with each of said sections formed offset to be disposed in a position tipped downwardly toward said outer edge when said disc is in the mower operating position, a blade removably attached to each of said sections adjacent said intermediate portion thereof to be disposed in a pitched position with the rotationally trailing end of each said blade being higher than the rotationally leading end thereof in the mower operating position, each said blade having a cutting edge on said leading end and said trailing end with each said blade attached to said disc to have each said cutting edge disposed radially beyond said outer edge of said disc and with said cutting edge on said leading end disposed at a negative cutting angle with respect to the radius of said disc and the direction of rotation of said disc, said negative cutting angle and the offset of each of said sections in the position tipped downwardly both being arranged to dispose said cutting edge on said leading end in a horizontal position in the mower operating position.

4. In a rotary type lawn mower, a rotor comprising a shaft rotatably mounted in said mower to be vertically disposed in the mowing position, a disc concentrically and non-rotatably mounted on said shaft and terminating in a radially outer edge, four circumferentially disposed and spaced sections formed in said disc to be indentations therein with each of said sections having a trailing portion with respect to the direction of shaft rotation and with said trailing portion disposed to be downwardly inclined in the direction of rotation of said shaft and in said mowing position, a blade removably attached to said trailing portion of each of said sections to be parallel thereto and disposed in a pitched position with said blade including a trailing end with respect to the direction of shaft rotation whereby said trailing end of each said blade is disposed higher than the opposite rotationally leading end of said blade in the mowing position, each said blade having a cutting edge on said leading end and said trailing end with each said blade attached to said disc to have each said cutting edge disposed radially beyond said outer edge of said disc.

References Cited in the file of this patent

UNITED STATES PATENTS

| | | |
|---|---|---|
| 2,071,872 | Cockburn | Feb. 23, 1937 |
| 2,154,564 | Eisenlohr | Apr. 18, 1939 |
| 2,192,762 | Vincze | Mar. 5, 1940 |
| 2,547,738 | Bosworth | Apr. 3, 1951 |
| 2,549,317 | Laughlin | Apr. 17, 1951 |
| 2,553,731 | Travis | May 22, 1951 |
| 2,561,293 | Ross | July 17, 1951 |
| 2,568,822 | Pervis | Sept. 25, 1951 |
| 2,579,837 | Lea | Dec. 25, 1951 |
| 2,592,755 | Soenksen | Apr. 15, 1952 |
| 2,621,457 | Rosenberg | Dec. 16, 1952 |
| 2,709,882 | Abel | June 7, 1955 |